United States Patent
Burkman et al.

(10) Patent No.: US 11,491,932 B2
(45) Date of Patent: Nov. 8, 2022

(54) INTEGRATED COMPONENTS OF AN ELECTRIFIED VEHICLE ELECTRICAL SYSTEM AND ELECTRICAL DISTRIBUTION METHOD

(71) Applicant: Ford Global Technologies, LLC, Dearborn, MI (US)

(72) Inventors: Wesley Burkman, Dearborn, MI (US); Baojin Wang, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 16/748,920

(22) Filed: Jan. 22, 2020

(65) Prior Publication Data
US 2021/0221309 A1 Jul. 22, 2021

(51) Int. Cl.
*B60R 16/023* (2006.01)
*H01H 9/54* (2006.01)
*H02P 29/00* (2016.01)

(52) U.S. Cl.
CPC ......... *B60R 16/0231* (2013.01); *H01H 9/542* (2013.01); *H02P 29/00* (2013.01)

(58) Field of Classification Search
CPC ...... H02P 29/00; H01H 9/542; B60R 16/0231
See application file for complete search history.

(56) References Cited

U.S. PATENT DOCUMENTS

| | | | |
|---|---|---|---|
| 6,002,221 A * | 12/1999 | Ochiai | B60L 3/0023 318/811 |
| 8,602,140 B2 | 12/2013 | White et al. | |
| 9,978,550 B2 * | 5/2018 | Kamata | H01H 50/02 |
| 10,602,578 B1 * | 3/2020 | Neri | A01G 7/045 |
| 10,688,946 B1 * | 6/2020 | Bove | B60K 37/06 |
| 2016/0087572 A1 * | 3/2016 | Kato | B60W 10/00 318/504 |
| 2018/0134160 A1 * | 5/2018 | Kratzer | B60L 58/13 |
| 2018/0186248 A1 * | 7/2018 | Juhl | B60L 3/04 |
| 2018/0208079 A1 * | 7/2018 | Noppakunkajorn | B60L 3/04 |
| 2018/0240629 A1 * | 8/2018 | Ao | B60L 58/10 |
| 2019/0296541 A1 * | 9/2019 | Mensch | H02H 1/0007 |
| 2021/0170899 A1 * | 6/2021 | Wang | B60L 58/20 |

FOREIGN PATENT DOCUMENTS

| | | |
|---|---|---|
| CN | 107768195 | 3/2018 |
| CN | 207321111 | 5/2018 |
| WO | 2005031777 | 4/2005 |

* cited by examiner

*Primary Examiner* — Jared Fureman
*Assistant Examiner* — Esayas G Yeshaw
(74) *Attorney, Agent, or Firm* — David B. Kelley; Carlson, Gaskey & Olds, P.C.

(57) ABSTRACT

An electrified vehicle electrical system includes, among other things, a contactor enclosure, and contactor contacts housed within the contactor enclosure. A resistor is housed within the contactor enclosure or is housed within a relay enclosure outside the contactor enclosure.

20 Claims, 4 Drawing Sheets

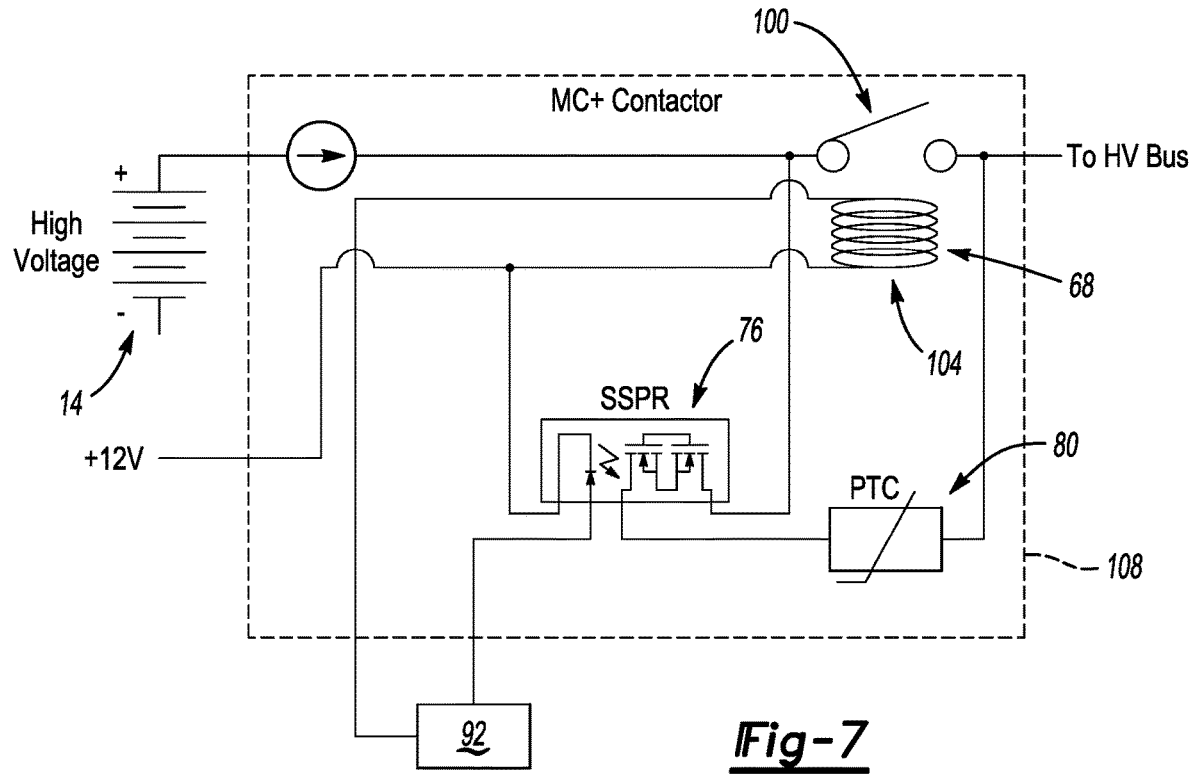
_Fig-7_
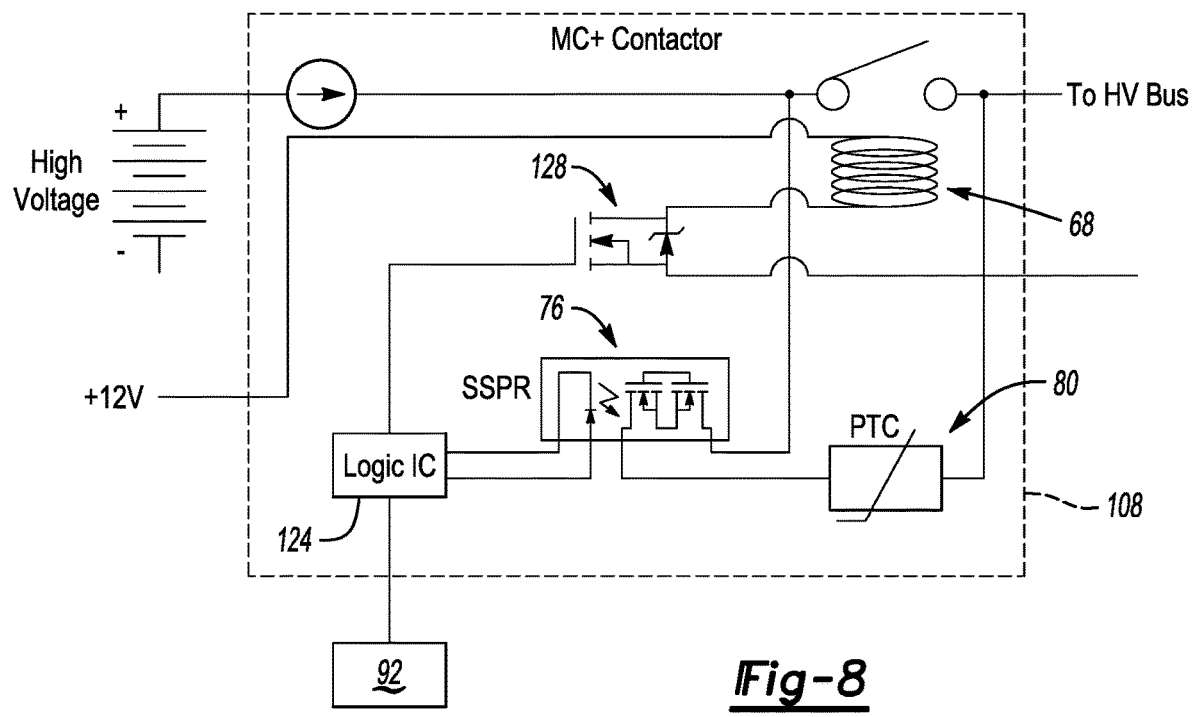
_Fig-8_

INTEGRATED COMPONENTS OF AN ELECTRIFIED VEHICLE ELECTRICAL SYSTEM AND ELECTRICAL DISTRIBUTION METHOD

TECHNICAL FIELD

This disclosure relates generally to integrated components of an electrified vehicle electrical system.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively with an internal combustion engine. Electrified vehicles may use electric machines instead of, or in addition to, the internal combustion engine. Example electrified vehicles include hybrid electric vehicles (HEVs), plug-in hybrid electric vehicles (PHEVs), fuel cell vehicles, and battery electric vehicles (BEVs). Within a powertrain of an electrified vehicle, an electrical system can be used to control a flow of electric power to and from the high-voltage battery pack.

SUMMARY

An electrified vehicle electrical system according to an exemplary aspect of the present disclosure includes, among other things, a contactor enclosure, and contactor contacts housed within the contactor enclosure. A resistor is housed within the contactor enclosure or is housed within a relay enclosure outside the contactor enclosure.

In another example of the foregoing system, the resistor is housed within the contactor enclosure with the contactor contacts.

In another example of any of the foregoing systems, a relay is housed within the contactor enclosure with the contactor contacts.

In another example of any of the foregoing systems, the relay is a solid state power relay.

In another example of any of the foregoing systems, the relay is an electromechanical precharge relay.

In another example of any of the foregoing systems, the resistor is housed within the relay enclosure with a relay. The relay enclosure that houses both the relay and the resistor is outside the contactor enclosure.

In another example of any of the foregoing systems, the relay is a solid state power relay.

In another example of any of the foregoing systems, the resistor is a precharge resistor.

In another example of any of the foregoing systems, the relay is a solid state power relay.

In another example of any of the foregoing systems, the resistor is a positive temperature coefficient resistor.

Another example of any of the foregoing systems includes a bussed electrical center enclosure. The contactor enclosure and the resistor are disposed within the bussed electrical center enclosure.

Another example of any of the foregoing systems includes a contactor electromagnet housed within the contactor enclosure.

An electrified vehicle electrical system according to another exemplary aspect of the present disclosure includes, among other things, a contactor enclosure, contactor contacts disposed within the contactor enclosure, a contactor electromagnet disposed within the contactor enclosure, a solid state power relay disposed within the contactor enclosure, and a positive temperature coefficient resistor disposed within the contactor enclosure.

Another example of any of the foregoing systems includes a bussed electrical center enclosure. The contactor enclosure is disposed within an interior of the bussed electrical center enclosure.

An electrical power distribution method according to yet another exemplary aspect of the present disclosure includes communicating a flow of electric current through a contactor enclosure and, within the contactor enclosure, regulating the flow of electric current using a resistor. The method further includes, within the contactor enclosure, communicating the flow of electric current through contactor contacts. The method further includes distributing the flow of electric current that has passed through the contactor contacts within the contactor enclosure to a load that is outside the contactor enclosure.

In another example of the foregoing method, the resistor is a positive temperature coefficient resistor that provides increased resistance in response to increased temperatures.

Another example of any of the foregoing methods includes, within the contactor enclosure, communicating the flow of electrical current to a relay.

In another example of any of the foregoing methods, the relay is a solid state relay.

In another example of any of the foregoing methods, the relay is a precharge relay.

Another example of any of the foregoing methods includes housing the resistor and the plurality of contactor contacts within the contactor enclosure, and housing the contactor enclosure within a bussed electrical center enclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows:

FIG. 7 illustrates a circuit diagram depicting selected portions of the electrical system of FIG. 2 according to an exemplary embodiment.

FIG. 8 illustrates a circuit diagram depicting selected portions of the electrical system of FIG. 2 according to another exemplary embodiment.

DETAILED DESCRIPTION

This disclosure details exemplary embodiments of an electrical system and electrical distribution method. Components of the electrical system can be integrated to, among other things, reduce required connections and reduce required packaging space.

Figure 1:
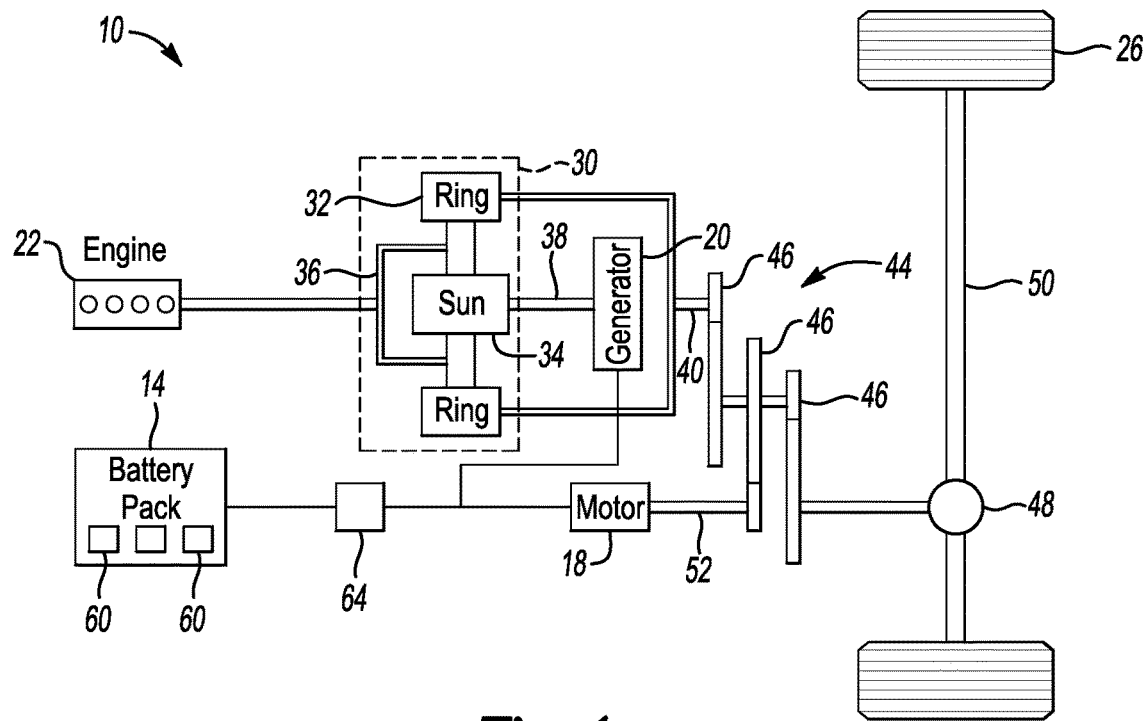
FIG. 1 illustrates a schematic view of a powertrain of an electrified vehicle.

FIG. 1 schematically illustrates a powertrain 10 for an electrified vehicle, which is a hybrid electric vehicle (HEV) in this example. Although depicted as an HEV, it should be understood that the concepts described herein are not limited to HEVs and could extend to other types of electrified vehicle, including, but not limited to, plug-in hybrid electric vehicles (PHEVs), battery electric vehicles (BEVs), fuel cell vehicles, etc.

The powertrain 10 includes a battery pack 14, a motor 18, a generator 20, and an internal combustion engine 22. The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, could be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable.

The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

The battery pack 14 provides a relatively high-voltage battery that can store generated electrical power and can output electrical power to operate the motor 18, the generator 20, or both.

The exemplary battery pack 14 provides a relatively high-voltage battery that can store generated electrical power and can output electrical power to operate the motor 18, the generator 20, or both. Arrays 60 of individual battery cells can be held within the battery pack 14 to store electrical power.

The powertrain 10 further includes an electrical system, such as a Bussed Electrical Center (BEC) 64 that is used to control a flow of current between the battery pack 14 and the remaining portions of the powertrain 10, such as the motor 18.

Figure 2:
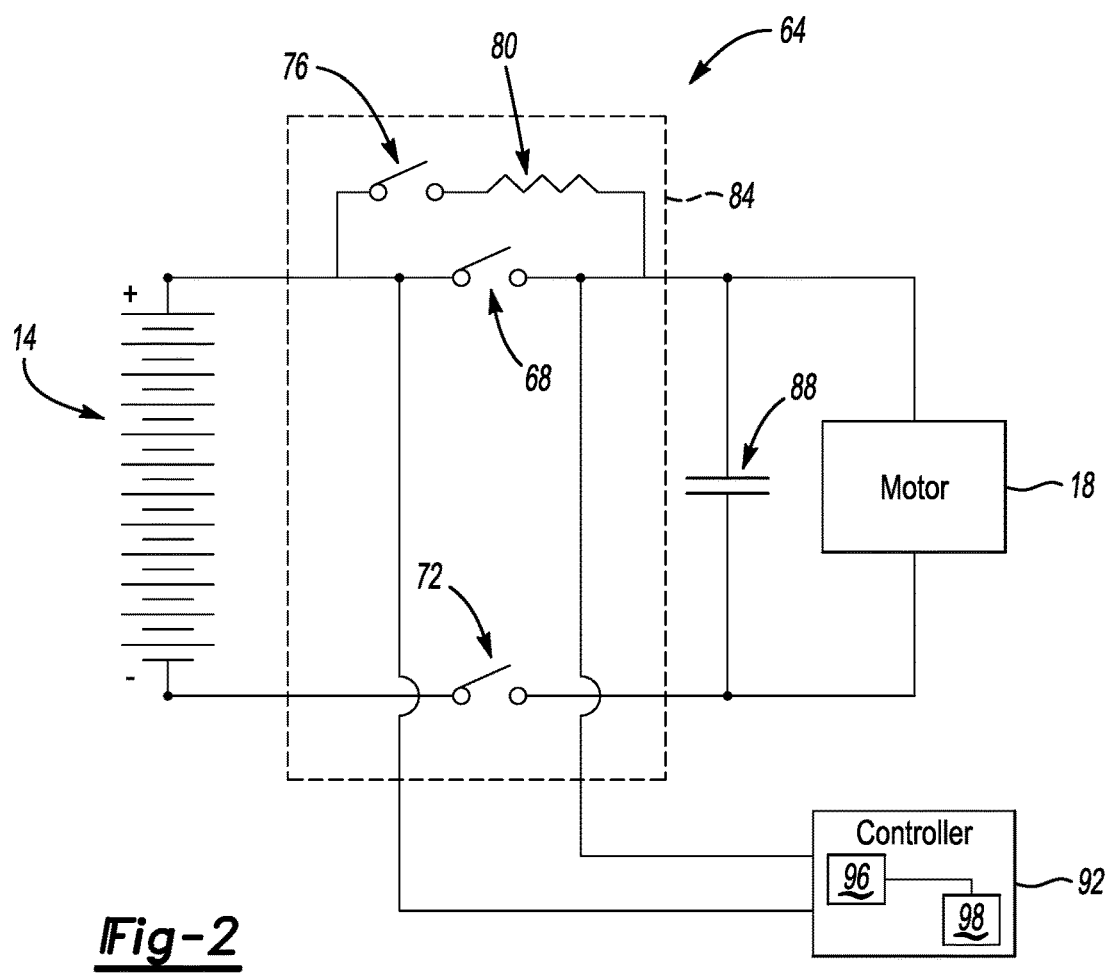
FIG. 2 illustrates a schematic view of an electrical system of the powertrain of FIG. 1.

With reference now to FIG. 2, the BEC 64 includes, among other things, a first main contactor 68, a second main contactor 72, a precharge relay 76, and a precharge resistor 80, and a BEC housing 84. The BEC housing 84 can be a polymer-based structure including a cover and a base. The cover and the base can be secured relative to one another to provide an interior of the BEC housing 84. The first main contactor 68, the second main contactor 72, the precharge relay 76, and the precharge resistor 80 can be housed within the interior. The BEC 64 can further include various electrical connectors, such as busbars, that are held by the BEC housing 84 to electrically couple together the various components.

The BEC 64 helps to control current flow between the battery pack 14 and the motor 18 and other portions of the powertrain 10. The BEC 64 forms part of a circuit between the battery pack 14 and the motor 18.

In this example, the first main contactor 68 is associated with a positive terminal of the battery pack 14 and the second main contactor 72 is associated with a negative terminal of the battery pack 14.

Capacitance within the powertrain 10 is schematically represented as a capacitor 88 in FIG. 2. If not accounted for, capacitance within the powertrain 10 can lead to substantial in-rush current when the powertrain 10 is started. The in-rush current can potentially damage components of the powertrain 10. As explained below, the resistor 80 can be used in combination with the precharge relay 76 to reduce in-rush current.

The first main contactor 68, the second main contactor 72, and the precharge relay 76 can be transitioned between open states and closed states. A controller 92 can be used to control the transitions of the first main contactor 68, the second main contactor 72, and the precharge relay 76. The controller 92 can be within the BEC housing 84, outside the BEC housing 84, or partially within the BEC housing 84.

When the first main contactor 68 and the second main contactor 72 have both transitioned to a closed state, current can flow through the portions of the circuit provided by the BEC 64. Further, when the precharge relay 76 and the second main contactor 72 have both transitioned to a closed state, current can flow through the portions of the circuit provided by the BEC 64. In particular, when the precharge relay 76 and the second main contactor 72 have both transitioned to the closed state, current can through the precharge resistor 80 such that the current moves through a relatively high resistance portion of the circuit.

Generally, when the powertrain 10 is started, the controller 92 transitions the precharge relay 76 and the second main contactor 72 to the closed state. After the capacitor 88 has mostly charged, the controller 92 transitions the first main contactor 68 to the closed state. The precharge relay 76 could optionally transition back to the open state at this stage.

Transitioning the precharge relay 76 to the closed state at startup prior to the first main contactor 68 causes current to flow through the precharge resistor 80, which reduces in-rush current. The precharge rely 76 can be, for example, an electromechanical precharge relay or a solid state power relay.

The example controller 92 includes a processor 96 and operatively linked to a memory portion 98. The example processor 96 can be programmed to execute a program stored in the memory portion 98. The program may be stored in the memory portion 98 as software code.

The program stored in the memory portion 98 may include one or more additional or separate programs, each of which includes an ordered listing of executable instruction for implementing logical functions. The processor 96 can be a custom made or commercially available processor, a central processing unit (CPU), an auxiliary processor among several processors associated with the controller 92, a semi-conductor-based microprocessor (in the form of a microchip or microchip set) or generally any device for executing software instructions.

The memory portion 98 can include one or a combination of volatile memory elements and/or nonvolatile memory elements. The memory portion 98 could incorporate electronic, magnetic, optical, and/or other types of storage media. The memory could have a distributed architecture where various components are situated remotely from one another, but can be accessed by the processor 96.

Figure 3:
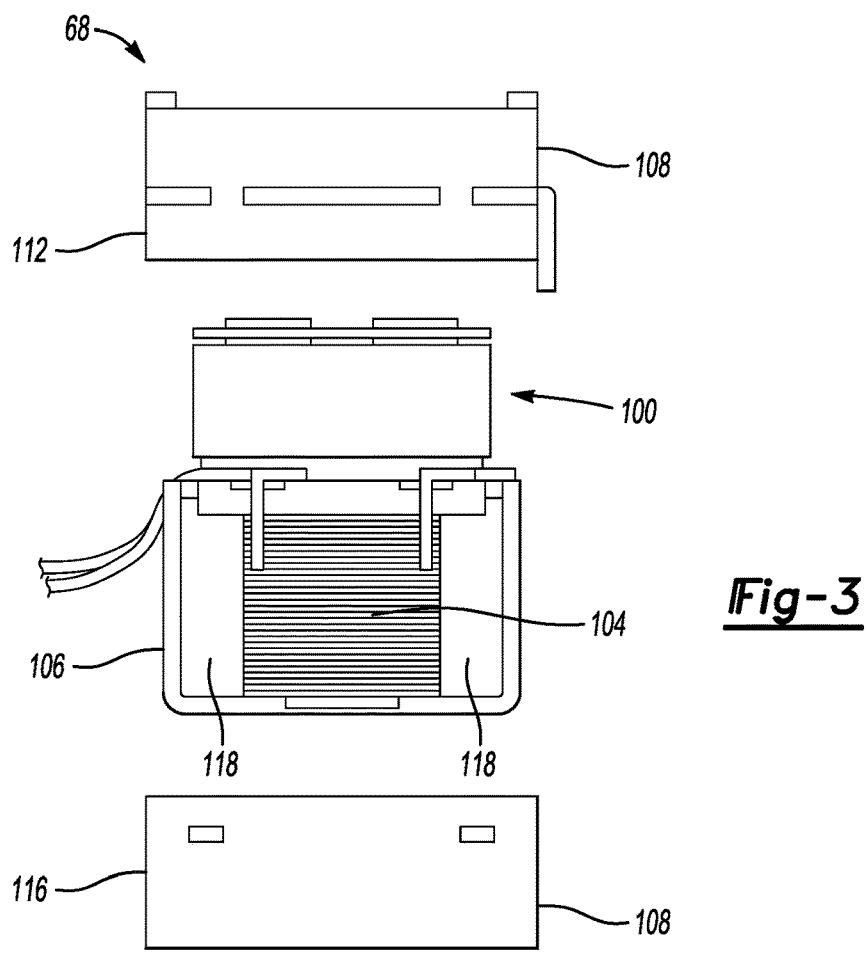
FIG. 3 illustrates a main contactor from the electrical system of FIG. 2 according to an exemplary embodiment.

Referring now to FIG. 3, the first main contactor 68 includes a plurality of contactor contacts 100, a contactor electromagnet 104, and outer core 106 and a contactor enclosure 108. In the exemplary embodiment, the contactor enclosure 108 includes a lid 112 (or cover) and a base 116. The lid 112 can be secured relative to the base 116 to provide an interior. The plurality of contactor contacts 100, the contactor electromagnet 104, and the outer core 106 are housed within the contactor enclosure 108 and held within the interior. The contactor enclosure 108 can be a polymer-based material. The outer core 106 can be a metal or metal alloy.

The exemplary contactor enclosure 108 includes open areas 118 within the interior. The contactor contacts 100 and the contactor electromagnet 104 of the first main contactor 68 are not positioned within the open areas 118. Exemplary embodiments of the present disclosure utilize these open areas to house other electrical components. This can integrate the first main contactor 68 with the other electrical components to reduce required packaging space and potentially reduce a number of required connections.

Figure 4:
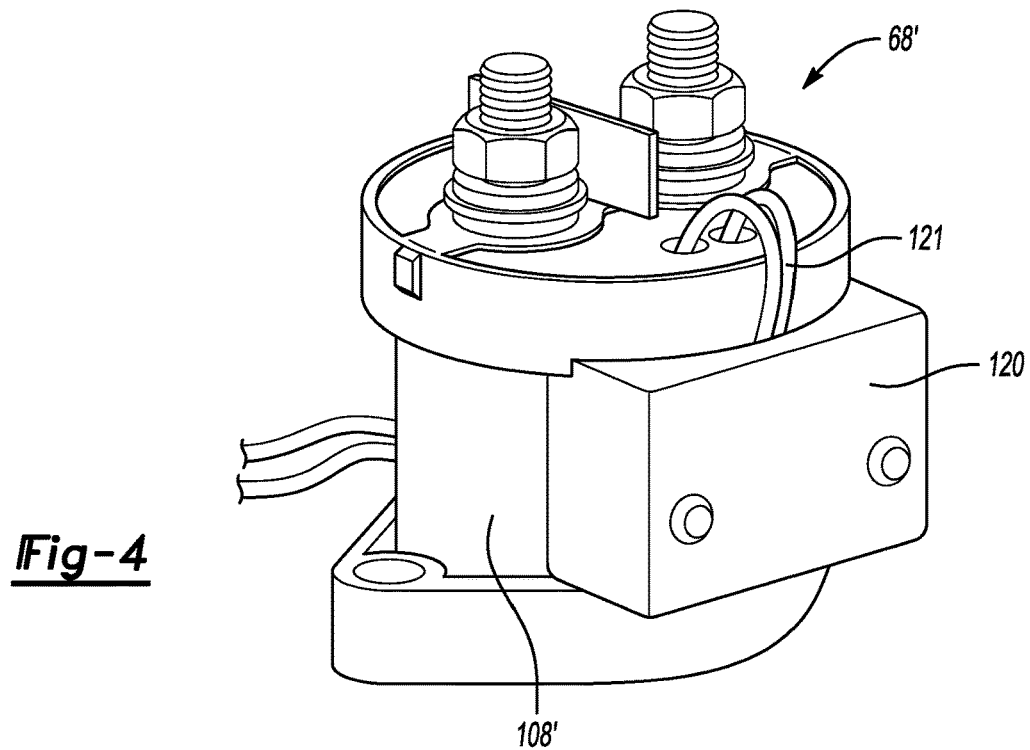
FIG. 4 illustrates a main contactor from the electrical system of FIG. 2 according to another exemplary embodiment.

FIG. 4 shows another exemplary embodiment of the first main contactor 68'. The first main contactor 68' includes a contactor enclosure 108'. The contactor enclosure 108' houses the plurality of contactor contacts and the contactor electromagnet of the first main contactor 68' within an interior of the first main contactor 68'.

Notably, the first main contactor 68' includes an accessory box area 120 formed within, or in addition to, the contactor enclosure 108'. The external accessory box area 120 can be used to house other electrical components.

The first main contactor 68' could include, within the external accessory box area 120, the other electrical components to reduce required packaging space and potentially reduce a number of required connections. In order to access the plurality of contactor contacts inside the contactor enclosure 108', an existing system of auxiliary contacts inside the contactor enclosure 108' may be used and accessed via wires 121 passing from the contactor enclosure 108' to the accessory box 120.

Figure 5:
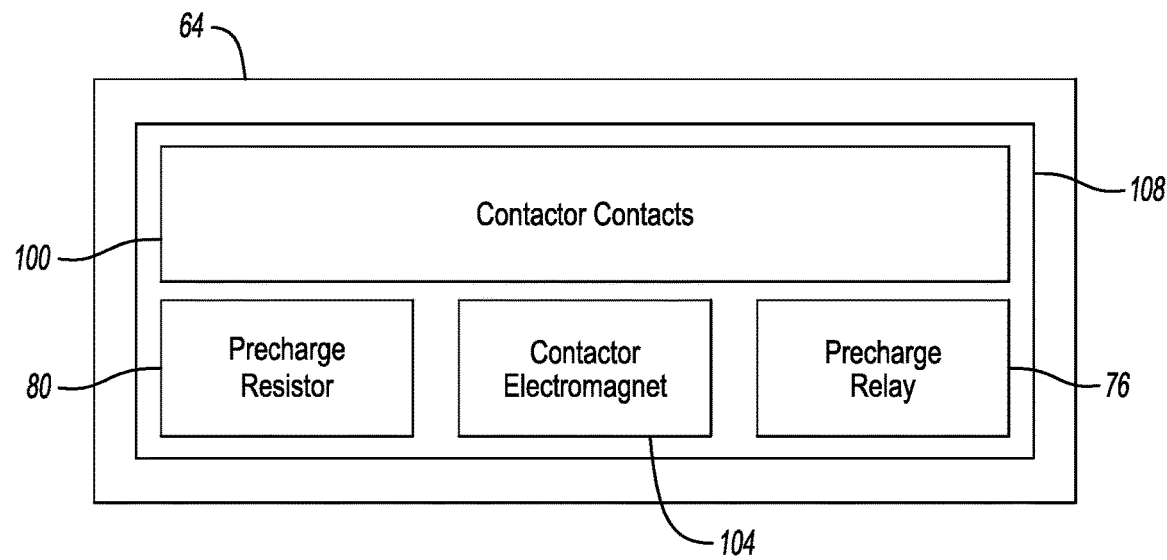
FIG. 5 schematically illustrates a configuration of selected components from the electrical system of FIG. 2 according to an exemplary embodiment.

With reference to FIG. 5, an exemplary configuration of integrated components of the electrical system provided by the BEC 64 includes the precharge relay 76, the precharge resistor 80, the contactor electromagnet 104, and the plurality of contactor contacts 100 all housed within the contactor enclosure 108 of the first main contactor 68. In this embodiment, the precharge relay 76, the precharge resistor 80, the contactor electromagnet 104, and the plurality of contactor contacts 100 are considered integrated components as they all reside within the contactor enclosure 108.

The contactor enclosure 108 is the enclosure structure that directly contains these components of the electrical system. Thus, although the first main contactor 68 could be housed along with other components within the BEC housing 84, the BEC housing 84 would not be considered a contactor enclosure as the BEC housing 84 does not directly contain the precharge relay 76, the precharge resistor 80, the contactor electromagnet 104, and the plurality of contactor contacts 100.

In operation, a flow of electric current can move through the contactor enclosure 108. With the contactor enclosure 108, the flow is regulated by the precharge resistor 80 and communicated through the contactor contacts 100. The flow of current that has passed through the contactor contacts 100 is then distributed to a load that is outside the contactor enclosure 108.

Figure 6:
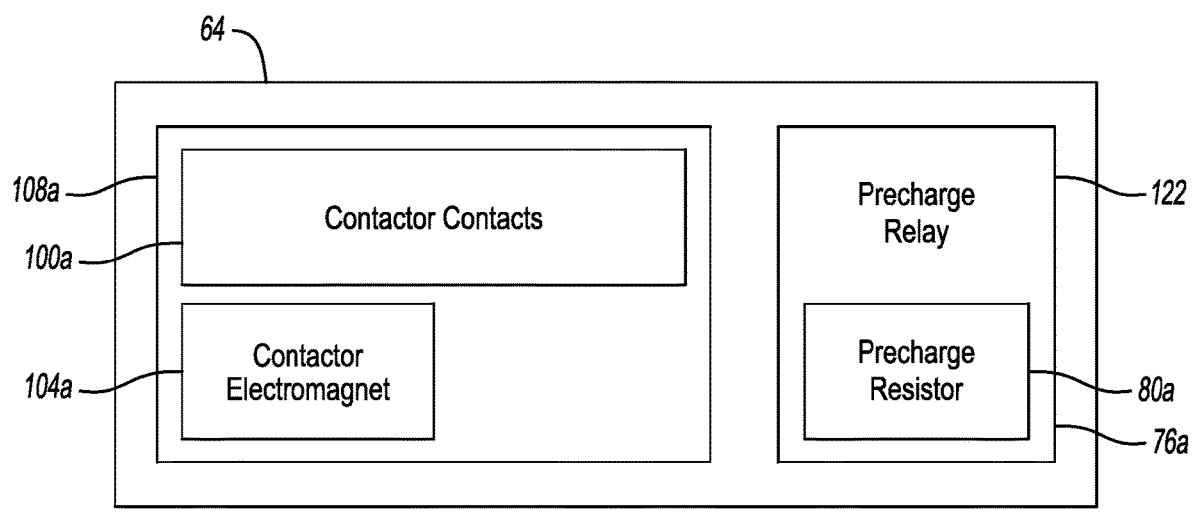
FIG. 6 schematically illustrates a configuration of selected components from the electrical system of FIG. 2 according to yet another exemplary embodiment.

FIG. 6 shows yet another exemplary embodiment where a precharge resistor 80a is housed within a precharge relay enclosure 122 of a precharge relay 76a. The precharge relay 76a, with the contained precharge resistor 80a, is then disposed outside of a contactor enclosure 108a, which houses contactor contacts 100a and a contactor electromagnet 104a. The precharge resistor 80a and the precharge relay 76a are integrated components in this embodiment as they both reside within the precharge relay enclosure 122.

With reference now to FIG. 7, an exemplary circuit is depicted where a precharge relay 76 and precharge resistor 80 are housed within the contactor enclosure 108, as was shown in FIG. 5. The precharge resistor 80 is, in the exemplary circuit, a positive temperature coefficient (PTC) resistor. As thermal energy within the PTC resistor increases, resistance also increases to further reduce current through the PTC resistor. The PTC resistor can be a through hole mount type with an outer diameter of 12.5 millimeters, for example.

The precharge relay 76 is, in the example of FIG. 7, a solid state power relay (SSPR), which is in series with the precharge resistor 80, and then in parallel with the contactor contacts 100 of the first main contactor 68. The SSPR that provides the precharge relay 76 has a control input path from the controller 92 in addition to a control input path used to transition the first main contactor 68 to the closed state. A gate of the SSPR can be isolated from high voltage of the battery pack 14, and can be driven directly with low voltage from a 12 Volt accessory battery in response to a command from the controller 92.

With reference to FIG. 8, a variation of the FIG. 7 system is shown where there is an additional logic integrated circuit 124 within the contactor enclosure 108 and a metal-oxide-semiconductor field-effect transistor (MOSFET) 128 on a low side drive of the first main contactor 68. When the controller 92 applies 12 Volts to the first main contactor 68, the logic integrated circuit 124 can transition the SSPR to a closed position and then delay for a calibratable amount of time, say 300 milliseconds. The logic integrated circuit 124 then opens the SSPR and closes the first main contactor 68 low side driver. The controller 92 can receive an input from a current sensor or voltage measurement circuit to assess whether the precharge event has sufficiently completed. In response to a fault, the controller 92 can depower the first main contactor 68 before the calibratable amount of time has expired and the contactor electromagnet 104, here a coil, is energized. The controller 92 can depower the first main contactor 68 in less than 300 milliseconds, for example.

In general, the embodiment of FIG. 8 helps to ensure that precharge is performed every time the main contactor 68 is commanded closed, to avoid situations where a controller 92 accidentally commands the contactor 68 closed when precharge has not been given a chance to start or complete.

Features of the disclosed examples include integrating various components of an electrified vehicle electrical system to reduce packaging space, reduce required contacts, or both. Reducing a distance between components that must be electrically connected can reduce a size of a busbar, for example. Integrating various components can lead to a BEC having a reduced overall size. Further, with less required connections, assembly steps can be reduced.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle electrical system, comprising:
   a contactor enclosure;
   a plurality of contactor contacts housed within the contactor enclosure; and
   a resistor housed within the contactor enclosure or housed within a relay enclosure outside the contactor enclosure.

2. The electrified vehicle electrical system of claim 1, wherein the resistor is housed within the contactor enclosure with the plurality of contactor contacts.

3. The electrified vehicle electrical system of claim 2, wherein a relay is housed within the contactor enclosure with the plurality of contactor contacts.

4. The electrified vehicle electrical system of claim 3, wherein the relay is a solid state power relay.

5. The electrified vehicle electrical system of claim 3, wherein the relay is an electromechanical precharge relay.

6. The electrified vehicle electrical system of claim 1, wherein the resistor is housed within the relay enclosure with a relay, wherein the relay enclosure that houses both the relay and the resistor is outside the contactor enclosure.

7. The electrified vehicle electrical system of claim 6, wherein the relay is a solid state power relay.

8. The electrified vehicle electrical system of claim 6, wherein the relay is an electromechanical precharge relay.

9. The electrified vehicle electrical system of claim 1, wherein the resistor is a precharge resistor.

10. The electrified vehicle electrical system of claim 1, wherein the resistor is a positive temperature coefficient resistor.

11. The electrified vehicle electrical system of claim 1, further comprising a bussed electrical center enclosure, wherein the contactor enclosure and the resistor are disposed within the bussed electrical center enclosure.

12. The electrified vehicle electrical system of claim 1, further comprising a contactor electromagnet housed within the contactor enclosure.

13. An electrified vehicle electrical system, comprising:
    a contactor enclosure;
    a plurality of contactor contacts disposed within the contactor enclosure;
    a contactor electromagnet disposed within the contactor enclosure;
    a solid state power relay disposed within the contactor enclosure; and
    a positive temperature coefficient resistor disposed within the contactor enclosure.

14. The electrified vehicle electrical system of claim 13, further comprising a bussed electrical center enclosure, the contactor enclosure disposed within an interior of the bussed electrical center enclosure.

15. An electrical power distribution method, comprising:
    communicating a flow of electric current through a contactor enclosure;
    within the contactor enclosure, regulating the flow of electric current using a resistor;
    within the contactor enclosure, communicating the flow of electric current through a plurality of contactor contacts; and
    distributing the flow of electric current that has passed through the plurality of contactor contacts within the contactor enclosure to a load that is outside the contactor enclosure.

16. The electrical power distribution method of claim 15, wherein the resistor is a positive temperature coefficient resistor that provides increased resistance in response to increased temperatures.

17. The electrical power distribution method of claim 15, further comprising, within the contactor enclosure, additionally communicating the flow of electrical current to a relay.

18. The electrical power distribution method of claim 17, wherein the relay is a solid state relay.

19. The electrical power distribution method of claim 17, wherein the relay is a precharge relay.

20. The electrical power distribution method of claim 15, further comprising housing the resistor and the plurality of contactor contacts within the contactor enclosure, and housing the contactor enclosure within a bussed electrical center enclosure.

* * * * *